US009697186B2

(12) United States Patent
Rogers et al.

(10) Patent No.: US 9,697,186 B2
(45) Date of Patent: *Jul. 4, 2017

(54) RETAINING STYLE INFORMATION WHEN COPYING CONTENT

(71) Applicant: Microsoft Technology Licensing, LLC, Redmond, WA (US)

(72) Inventors: Justin E. Rogers, Redmond, WA (US); Markus W. Mielke, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/784,623

(22) Filed: Mar. 4, 2013

(65) Prior Publication Data

US 2013/0298010 A1  Nov. 7, 2013

Related U.S. Application Data

(63) Continuation of application No. 12/987,417, filed on Jan. 10, 2011, now Pat. No. 8,392,844, which is a continuation of application No. 11/754,662, filed on May 29, 2007, now Pat. No. 7,870,502.

(51) Int. Cl.
  *G06F 17/22* (2006.01)
  *G06F 17/21* (2006.01)
  *G06F 17/24* (2006.01)

(52) U.S. Cl.
  CPC ........ *G06F 17/2247* (2013.01); *G06F 17/218* (2013.01); *G06F 17/24* (2013.01)

(58) Field of Classification Search
  CPC ............................ G06F 17/2247; G06F 17/24
  USPC .................................................. 715/770, 235
  See application file for complete search history.

(56) References Cited

U.S. PATENT DOCUMENTS

| 5,079,700 A | 1/1992 | Kozoll et al. |
| 5,781,915 A | 7/1998 | Kohno et al. |
| 6,128,655 A | 10/2000 | Fields et al. |
| 6,366,923 B1 | 4/2002 | Lenk et al. |
| 6,874,084 B1 | 3/2005 | Dobner et al. |
| 6,968,504 B2 | 11/2005 | Broman et al. |
| 7,444,597 B2 | 10/2008 | Perantatos et al. |

(Continued)

OTHER PUBLICATIONS

"Cascading Style Sheets", Retrieved from <<http://www.perlscriptsjavascripts.com/tutorials/html/chapten.html>> on Dec. 8, 2006, (1999), 6 pages.

(Continued)

*Primary Examiner* — Ryan Pitaro (57) ABSTRACT

An illustrative implementation is described for copying an identified portion of source content along with style information associated with the portion. The implementation allows the identified portion to be pasted into target content. By virtue of the extraction and retention of style information, the identified portion that is pasted into the target content visually resembles the identified portion as it appears in the source content. The implementation can identify relevant style information to be preserved based on a contextual analysis of style information applied to the source content. In one illustrative case, some of the style information may be revealed by parts of the content that are not directly demarcated by the identified portion.

20 Claims, 7 Drawing Sheets

(56) References Cited

U.S. PATENT DOCUMENTS

| | | |
|---|---|---|
| 7,624,353 B2 | 11/2009 | Beumer |
| 7,631,268 B2 | 12/2009 | McGowan et al. |
| 7,793,224 B1 | 9/2010 | Ayers |
| 7,870,502 B2 | 1/2011 | Rogers |
| 7,904,807 B2 | 3/2011 | Bell et al. |
| 8,392,844 B2 | 3/2013 | Rogers et al. |
| 2002/0123878 A1 | 9/2002 | Menke |
| 2002/0124172 A1 | 9/2002 | Manahan |
| 2003/0028762 A1 | 2/2003 | Trilli et al. |
| 2003/0177449 A1 | 9/2003 | Rose |
| 2004/0163048 A1 | 8/2004 | McKnight et al. |
| 2005/0022116 A1 | 1/2005 | Bowman et al. |
| 2005/0149871 A1 | 7/2005 | Broman et al. |
| 2005/0154994 A1 | 7/2005 | Chen et al. |
| 2005/0203935 A1 | 9/2005 | McArdle |
| 2005/0268100 A1 | 12/2005 | Gasparini et al. |
| 2006/0041589 A1 | 2/2006 | Helfman et al. |
| 2006/0053293 A1 | 3/2006 | Zager et al. |
| 2006/0136353 A1 | 6/2006 | Crockett et al. |
| 2006/0136819 A1 | 6/2006 | Tolle et al. |
| 2006/0218403 A1 | 9/2006 | Sauve et al. |
| 2006/0218492 A1 | 9/2006 | Andrade |
| 2006/0248442 A1 | 11/2006 | Rosenstein et al. |
| 2008/0005751 A1 | 1/2008 | Chandra |
| 2008/0082932 A1* | 4/2008 | Beumer .................. G06F 9/543 715/770 |
| 2008/0139191 A1 | 6/2008 | Melnyk et al. |
| 2008/0189600 A1 | 8/2008 | Lau et al. |
| 2008/0195932 A1 | 8/2008 | Oikawa et al. |
| 2008/0195945 A1 | 8/2008 | Vaughan et al. |
| 2008/0196040 A1 | 8/2008 | Mochel |
| 2008/0301560 A1 | 12/2008 | Rogers |
| 2009/0031238 A1 | 1/2009 | Berstis et al. |
| 2011/0107200 A1 | 5/2011 | Rogers |

OTHER PUBLICATIONS

"Final Office Action", U.S. Appl. No. 11/754,662, (Jul. 8, 2010),13 pages.

"Non-Final Office Action", U.S. Appl. No. 11/754,662, (Mar. 5, 2010),11 pages.

"Non-Final Office Action", U.S. Appl. No. 12/987,417, (May 23, 2012),15 pages.

"Notice of Allowance", U.S. Appl. No. 11/754,662, (Sep. 3, 2010), 6 pages.

"Notice of Allowance", U.S. Appl. No. 12/987,417, (Nov. 2, 2012), 6 pages.

"Protecting Commercial Secure Web Servers from Key-Finding Threats", nCipher, Inc., Available at <www.ncipher.com/uploads/resources/pcws.pdf>,(1999),12 pages.

"Style Sheet", Retrieved from <<http://style-sheet.qarchive.org/>> on Dec. 8, 2006, (2006), 4 pages.

Ducharme, Bob "Copying, Deleting, and Renaming Elements", Retrieved from <<http://www.xml.com/pub/a/2000/06/07/transforming/index.html>> on Jun. 7, 2000, O'Reily Media, Inc., (Jun. 7, 2000), 5 pages.

Herzberg, Amir et al., "Protecting (even) Naive Web Users, or: Preventing Spoofing and Establishing Credentials of Web Sites", Bar Ilan University, Available at <www.cs.bu.ac.il/~herzea/papers/ecommerce/trusted credentials area.pdf>,(Jul. 18, 2004), 26 pages.

VeriSign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.

* cited by examiner

RETAINING STYLE INFORMATION WHEN COPYING CONTENT

RELATED APPLICATIONS

This application is a continuation of and claims priority to U.S. patent application Ser. No. 12/987,417 filed Jan. 10, 2011, which is a continuation of and claims priority to U.S. patent application Ser. No. 11/754,662 filed May 29, 2007. The disclosures of these applications are incorporated by reference herein in their entirety.

BACKGROUND

An application may allow a user to copy an identified portion of source content into a clipboard store. The user may then paste the identified portion into target content. In many cases, the user may want the identified portion to look the same in the target content as it does in the source content. However, this objective is not always attained. The identified portion has a prescribed style when it appears in the source content. The process of copying the identified portion into the clipboard store may not adequately capture the style information applied to the identified portion in the source content. As a result, the identified portion may not have the same visual appearance in the target content as it does in the source content.

Figure 1:
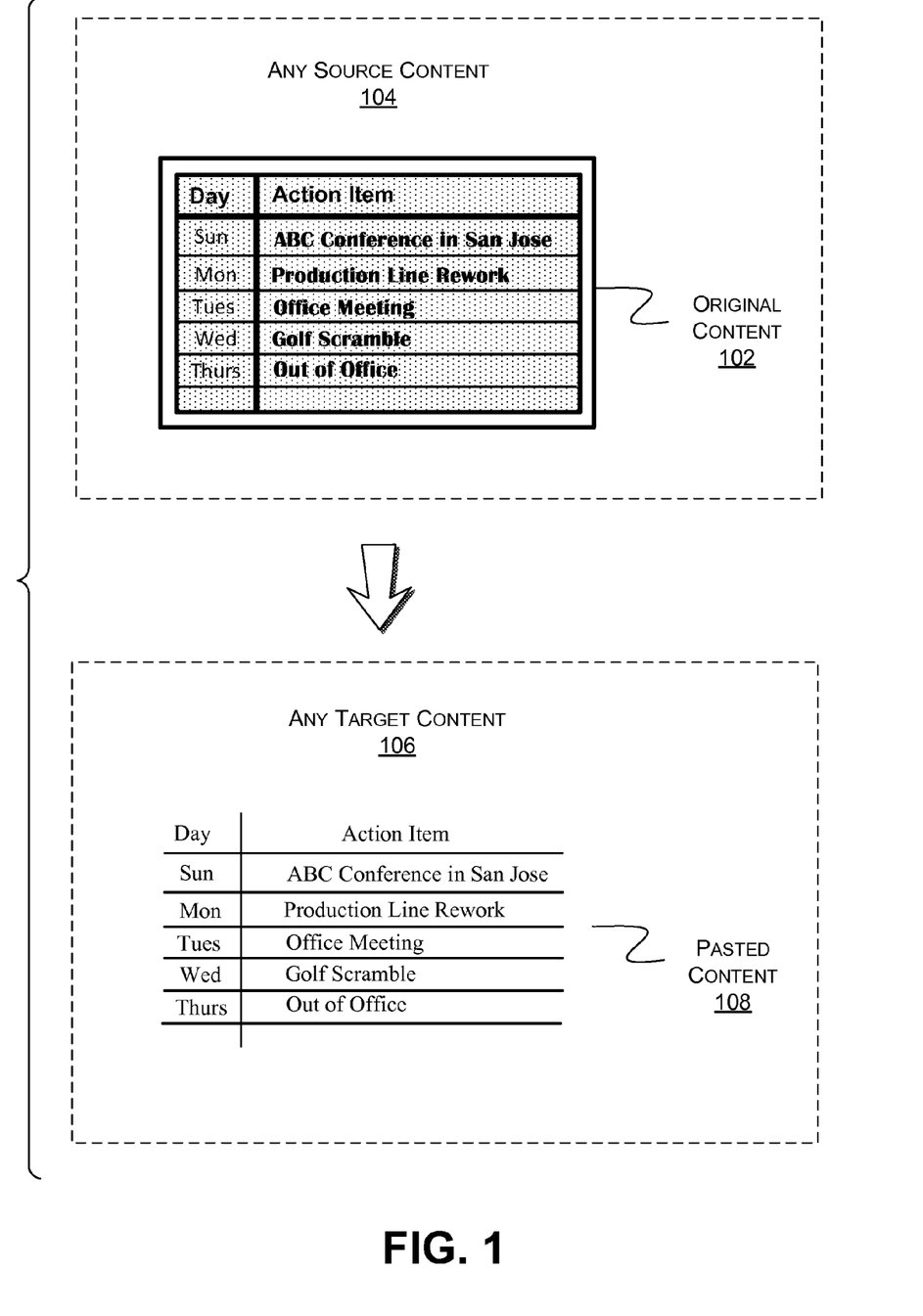
FIG. 1 shows an example of a copy and paste operation that does not adequately preserve style information applied to an identified portion within source content.

Consider the illustrative example shown in FIG. 1. In this case, the user has copied a table 102 into a clipboard store. The table 102 appears in source content 104. For example, the table 102 may appear in an encompassing page of content created by a particular application. The user pastes the table 102 stored in the clipboard store into target content 106. The table 102 appears in the target content 106 as pasted table 108.

As shown, the table 102, as it appears in the source content 104, presents information using a prescribed style. For instance, the table 102 presents text in various fonts. Further, the table 102 uses a double-lined border to enclose its text. The act of copying the table 102 to the clipboard store may not capture this style information. As such, when pasted into the target content 106, the table 102 will not appear the same as it does in the source content 102. In the illustrative case of FIG. 1, the pasted table 108 does not have the same fonts used in the table 102. Further, the pasted table 108 has lost its double-lined border. The user can manually reintroduce the style information to the pasted table 108, but this may be a labor-intensive and tedious process.

Some content can be expressed using a presentation-related markup language, such as the commonly used HyperText Markup Language (HTML). HTML describes content using presentation-related tags, e.g., by using tags to identify paragraphs, headers, images, and so forth. HTML can also work in conjunction with style sheets provided by Cascading Style Sheets (CSS). When copying an identified portion of HTML, it may be particularly challenging to preserve style information that pertains to the identified portion.

For at least the above-described illustrative reasons, there is a need for a more effective way to copy information from source content while retaining the style information that is applied to the information within the source document.

SUMMARY

An illustrative implementation is described for copying an identified portion of source content along with style information associated with the identified portion. The illustrative implementation allows the identified portion to be pasted into target content. By virtue of the extraction and retention of style information, the identified portion that is pasted into the target content visually resembles the identified portion as it appears in the source content.

The illustrative implementation can identify relevant style information to be preserved based on a contextual analysis of style information applied to the source content. In one illustrative case, the style information may be indirectly associated with the identified portion. For instance, the style information may pertain to a parent node or ancestor node associated with the identified portion, or some other node that is not directly demarcated by the identified portion.

Additional illustrative implementations and features are described in the following.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an illustrative implementation for copying an identified portion from source content and pasting the identified portion into target content. The copying operation preserves style information that is applied to the identified portion in the source content, thus enabling the identified portion to look the same in the target content as it does in the source content. The implementation can be manifested in various systems, apparatuses, modules, procedures, storage mediums, data structures, and other forms.

This disclosure includes the following sections. Section A describes an illustrative system for copying and pasting content. Section B describes illustrative procedures that explain the operation of the system of Section A.

A. Illustrative System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System

Figure 2:
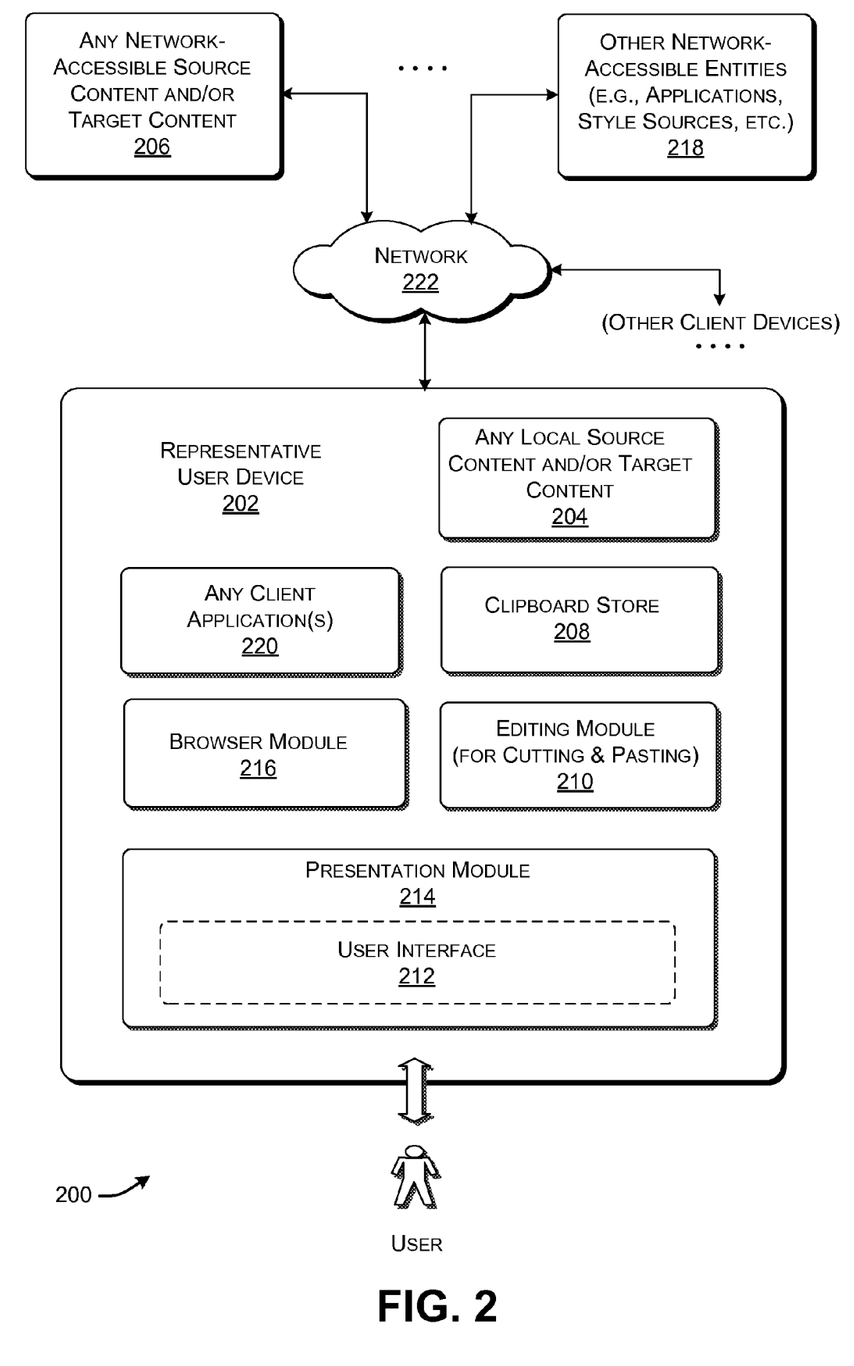
FIG. 2 shows one illustrative system for copying and pasting an identified portion, while retaining style information applied to the identified portion in source content.

FIG. 2 shows an overview of an illustrative system 200 that can be used to copy information from source content into target content, while preserving style information that applies to the identified portion in the source content. As used herein, the term "style information" has broad connotation. Style information generally controls the visual appearance and/or behavior of information when it is presented, as opposed to information which generally conveys the structure of the information or the semantic nature of the information, and so on. Without limitation, common types of style information convey the font used to present textual information, the color used to present information, the use of bold, italics, underling, etc. to present information, the use of borders to present information, and so on.

In one non-limiting and illustrative case, the source content may comprise a document expressed in a presentation-related markup language, such as, without limitation, the HyperText Markup Language (HTML). The style information may be expressed mainly using style sheet information, such as, without limitation, style sheets provided in accordance with the Cascading Style Sheets (CSS) format. In this example, the style information may correspond in part to the CSS information which is associated with an identified portion. Such style information may be expressed inline within the HTML document. In addition, or alternatively, the style information may be provided in one or more external style sheets which are referenced by the HTML document.

In addition, the style information may correspond to certain parts of the HTML content itself which contribute to the manner in which an identified portion is presented. Further, the style information can also govern other presentation-related characteristics of the content, such as the manner in which information is presented to a user in audible form. Thus, to repeat, the term "style information" is intended to have broad connotation as used herein.

One objective of the copying operation is extract style information in the source content that may not be directly demarcated by the identified portion selected by the user. For example, consider the case in which a user selects a certain feature on a page of source content, such as a heading within a displayed page of HTML-based content. This feature may correspond to (or "demarcate") a particular part of the HTML document that is used to produce the page, such as one or more elements within the HTML markup information. However, the style information which applies to these elements may ensue from other parts of the HTML document (or elsewhere). In other words, the style information is not necessarily co-located with the HTML elements to which the identified portion most closely pertains.

With the above introduction, the illustrative features of the system 200 of FIG. 2 will now be described. In one case, a user operates a representative user device 202 to copy an identified portion from source content and to optionally paste the identified portion into target content. The representative user device 202 can correspond to any kind of electronic processing device, such as a personal computer, a laptop computer, a personal digital assistant (PDA), a game console device, a set-top box associated with a television unit, and so forth.

In one illustrative case, the user can use the representative user device 202 to copy an identified portion from source content 204 which is local with respect to the user device 202. In addition or alternatively, the user can use the user device 202 to copy an identified portion from source content 206 which is remote with respect to the user device 202. This copying operation can cause the identified portion to be stored on a local clipboard store 208 and/or a remote clipboard store (not shown), and/or some other kind of store. The clipboard store 208 corresponds to any kind of store for retaining information that is typically being transferred from any kind of source content to any kind of target content for any purpose.

In one illustrative case, the user can then use the user device 202 (or another user device) to paste the identified content stored in the clipboard store 208 into local target content 204. In addition, or alternatively, the user can use the user device 202 to paste the identified portion into remote content 206.

The user device 202 includes an editing module 210 which performs the above-described cutting and pasting. The editing module 210 can comprise a standalone application or may be a component within a more encompassing application. For example, in one illustrative case, the editing module 210 is a component within a web content authoring tool that is used to produce web pages and the like. As will be described below with reference to FIG. 3, the editing module 210 can include a copying module and a pasting module. In one case, an integral editing module 210 provides both the editing and pasting modules. In another case, two separate applications implement the respective editing and pasting modules.

A user can interact with the editing module 210 via a user interface 212 that is presented by a presentation module 214. In one illustrative case, the user interface 212 corresponds to a graphical user interface (GUI) presentation that is displayed on a computer monitor or like device. Alternatively or in addition, the presentation module 214 can present information to a user in audible form.

The source content can correspond to any kind of information expressed in any form that is produced by any application. For example, in one illustrative case, the source content corresponds to presentation-related markup language content, such as HTML, that is presented in one or more pages. Such HTML content can originate from the local source 204 and/or the remote source 206. A browser module 216 (or other type of application that can interpret HTML content) can be used to present the HTML content. The HTML content may make reference to external sources. For example, the HTML content may make reference to one or more external style sheets. The browser module 216 can obtain such style sheets from one or more external sources, generally represented as other network-accessible entities 218 shown in FIG. 2.

The target content can likewise correspond to any kind of information expressed in any form that is produced by any application. For example, in one illustrative case, the target content also corresponds to presentation-related markup language content, such as HTML, that is presented in one or more pages. In this illustrative scenario, the goal may be to copy a portion of one HTML page into another HTML page using a web page authoring tool. In another illustrative case, the target content may correspond to other types of documents produced by any other application (generally represented in FIG. 2 as client applications 220, although the applications can also be network-accessible applications, such as shared Terminal Services applications implemented on a remote server). For example, in one illustrative case, the user may copy a portion of an HTML page into the clipboard store 208 and then paste this identified portion into a document produced by a word processing application, a document produced by a spreadsheet program, a document produced by a drawing program, and so forth. Each of these types of applications uses prescribed rules to present information in the documents that it produces. Thus, each of these applications may apply unique rules in determining how to merge an identified portion into the documents that it produces.

In yet another illustrative case, the target document may correspond to the same document as the source content. For instance, the user may copy an identified portion of a page and then copy the portion onto a different part of the page, and/or duplicate the copied portion within the page.

In one illustrative implementation, the system 200 also includes a network 222 (which may represent one or more component networks). The network 222 can be used to couple any local aspect of the system 200 with a network-accessible aspect of the system 200. The network 222 can represent a local area network (LAN), a wide area network (WAN) (e.g., the Internet), or some combination of LAN(s) and WAN(s). The network 222 can be implemented by any combination of wireless links, hardwired links, routers, gateways, name servers, and so forth, and can be governed by any protocol or combination of protocols.

A.2. Illustrative Editing Module

Figure 3:
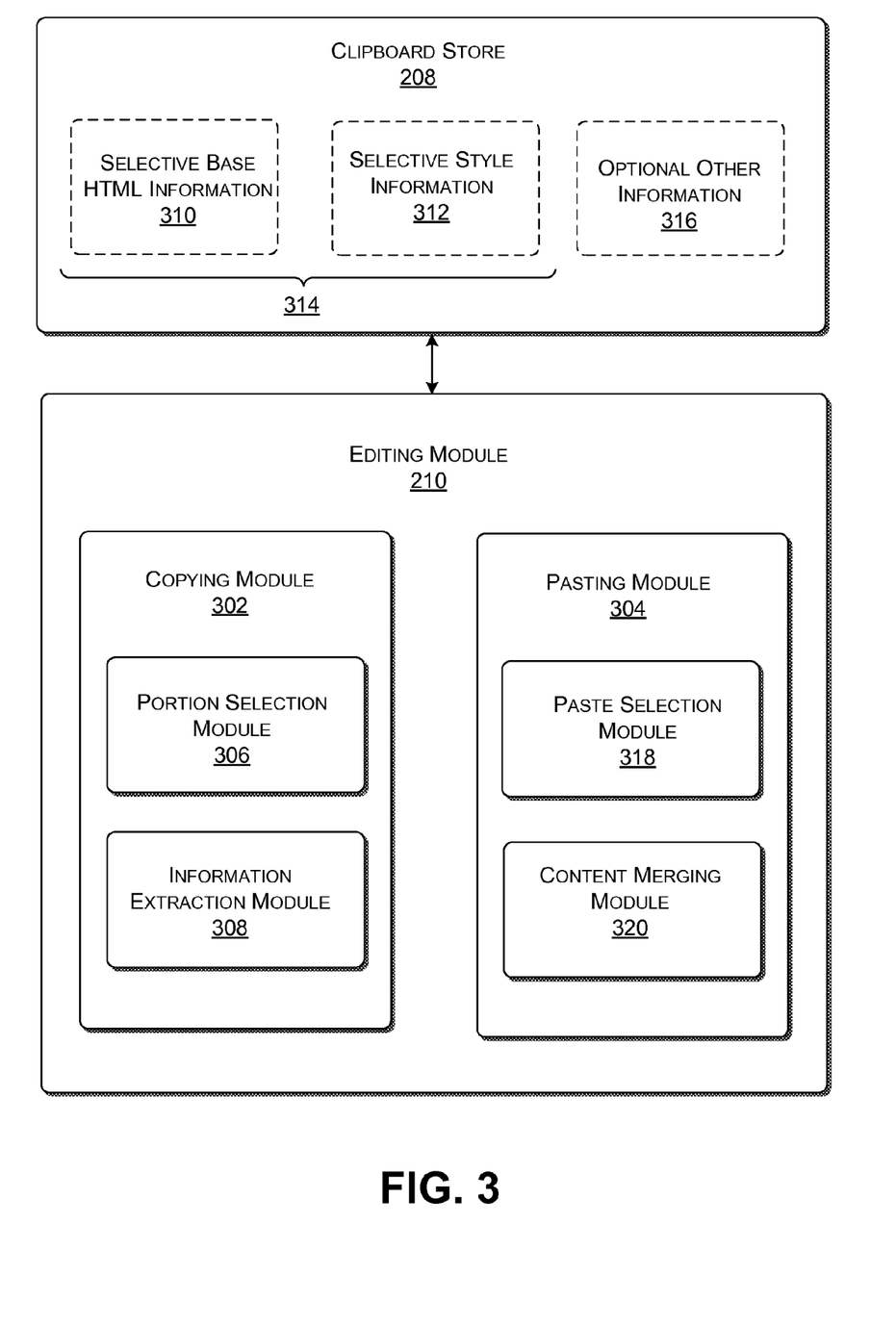
FIG. 3 shows one illustrative editing module and clipboard store for use in the system of FIG. 2.

FIG. 3 is a more detailed depiction of the editing module 210 and the clipboard store 208, which were introduced in FIG. 2. In one illustrative implementation, the editing module 210 includes a copying module 302 for copying an identified portion into the clipboard store 208, while retaining style information that applies to the identified portion in the source content. The editing module 210 also includes a pasting module 304 for pasting the identified portion into target content. As explained above, to facilitate explanation, the editing module 210 corresponds to an integrated module that includes both the copying module 302 and the pasting module 304. However, in other implementations, different editing applications can separately implement the copying module 302 and the pasting module 304, respectively.

Addressing the copying module 302 first, this module 302 includes a portion selection module 306. The purpose of the portion selection module 306 is to select a part of the source content, which is referred to herein as the "identified portion." The portion selection module 306 can use different techniques to select the identified portion. According to one illustrative technique, the user uses a graphical positioning device (such as a mouse device) and/or other kind of input device to select a part of the source content that is presented on the user interface 212 of the presentation module 214. For example, assume that the source content presents a page of content that is based on underlying HTML information. The user can use the portion selection module 306 to select any part of the page (e.g., a paragraph, etc.). The user can perform this operation using a mouse device, such as by positioning a cursor on an identified portion of the content and making a click selection, and/or clicking and dragging on the source content to define a portion of selectable content, and so on. In another illustrative case, the user can directly display the underlying HTML content and/or associated style information of the document. In this case, the user can use a mouse device and/or other type of input device to directly select a part of the HTML content, rather than the document that can be rendered based on the HTML content. Still other techniques can be used to select an identified portion.

In one illustrative implementation, the copying module 302 also includes an information extraction module 308. The purpose of the information extraction module 308 is to extract relevant information associated with the identified portion. The relevant information includes any information that is directly demarcated by the user's selection. For example, in the case in which the user clicks on a paragraph of a document, the extracted portion corresponds to the element(s) of the underlying HTML document which directly correlate with the selected paragraph. The element that is directly demarcated by the user's selection can also include (or can reference) style information that can be extracted by the information extraction module 308. More specifically, in some cases, the information extraction module 308 can extract style information which is present in the HTML document itself, such as inline style information which appears within the HTML document. In other cases, the information extraction module 308 can retrieve and extract style information which is referenced by the HTML document; such style information may originate from an external source, such as one or more external network-accessible sources that apply one or more CSS style sheets.

The information extraction module 308 also extracts relevant information that may not be directly demarcated by the user's selection of the identified portion. According to one approach to extracting this information, the identified portion may correspond to an element in an HTML document (or multiple elements). The selected element, in turn, may appear within a hierarchy of elements in the HTML document. The information extraction module 308 explores the hierarchical structure to discover any nodes in the document that may have a bearing on the way that the identified portion is presented in the source content. Such nodes may correspond to parent nodes or ancestor nodes with respect to the identified portion. For example, a parent node may provide information that indicates that a table (corresponding to the identified portion) includes a certain type of border. The information extraction module 308 can extract relevant information gleaned by examining the hierarchy in this manner.

In other illustrative cases, the information extraction module 308 may discover that other types of nodes (e.g., other than parent or ancestor nodes) have a bearing on how the identified portion should be presented. For example, the information extraction module 308 may determine that sibling nodes (with respect to the identified portion) have a bearing regarding how the identified portion is presented in the target content.

The information extraction module 308 can determine whether style information is relevant to an identified portion using different approaches. In one illustrative implementation, a relevant style sheet may include a collection of selectors. The selectors identify features that may be present in an HTML document. The style sheet includes a collection of rules that identify what style operations should be applied to the features. Thus, for example, a style sheet may include a selector which identifies a certain type of header that may appear in a document. The style sheet may identify what style operations should be applied to the header. By leveraging this aspect of style sheets, the information extraction module 308 can extract relevant style information by identifying what type of elements are associated with the identified portion, and then determining whether there are any style rules contained in or referenced by the source content that apply to the identified elements.

In certain illustrative cases, a style rule may apply to the identified content within the source content by virtue of relatively complex matching considerations. These matching considerations may depend on the context in which the identified portion appears within the source content, e.g., taking into consideration sibling nodes with respect to the identified portion and/or other types of neighboring nodes within the source content. For this type of rule, there arises the challenge that it becomes difficult to extract the relevant style information without retaining a large part of the source content (and perhaps all of it), as this large part provides the context which triggers the application of the rule.

To address this situation, in one illustrative implementation, the information extraction module 308 can rewrite the rule so that it applies to the identified portion without having to preserve a large part of the source content. Alternatively, or in addition, the information extraction module 308 can interject enough node structure into the clipboard store 208 such that a style rule continues to apply to the identified portion. For example, in the case in which the applicability of a rule depends on the presence of certain neighboring nodes that are not per se demarcated by the identified portion, the information extraction module 308 can introduce placeholder "empty" neighboring nodes into the information that it stores onto the clipboard store 208. These placeholder nodes trigger the application of a relevant style rule.

In another illustrative technique, a developer tool can be used which displays both a rendered page of content and the underlying HTML content and/or style information used to produce the rendered page. In one illustrative technique, the developer tool can allow a user to select any feature in the rendered page (such as a header feature in a rendered page), whereupon the tool will display the HTML and/or source information corresponding to the part (such as the corresponding header HTML element and the style information used to format this header feature). The user can also select HTML content, which causes the corresponded part of the rendered page to be highlighted. In this technique, the user can use manual or semi-automated techniques to select relevant style rules which the tool reveals as being related to an identified portion of source content.

Still other illustrative techniques can be used to identify and extract relevant information from source content. As a final note, the information extraction module 308 can omit certain parts of the selected HTML and style information, even if such information is directly demarcated by the identified portion. This is because the information extraction module 208 may determine that this information is extraneous, meaning that it does not control the presentation of any aspect of the identified portion selected by the user. Omitting extraneous content is advantageous because it reduces the amount of information that needs to be stored in the clipboard module 208.

The copying module 302 can store the extracted information in the clipboard store 208 using various formats. In one illustrative implementation, according to one format, the copying module 302 stores base HTML content in a first store 310. The base HTML content corresponds mainly to structural parts of the markup content, rather than style information, although parts of the base HTML content can also correspond to style information. The copying module 302 can store information that is predominately style-related in nature in a style information store 312. Together, the stores 310 and 312 comprise a collection of information 314 that is sufficient to reconstruct the identified portion when it is pasted within target content.

The copying module 302 can also optionally store the identified portion in another store 316 (or stores) using another format. For example, the copying module 302 can extract larger parts of the source content and store such parts in the optional store 316. For instance, the copying module 302 can store the complete source content in the store 316 when the user selects an identified portion within the source content. The copying module 302 can include markers to demarcate an identified portion within the content stored in the store 316. The user can reconstruct the identified portion using the information stored in the collection of stores 314 and/or the information stored in the optional alternative store 316 (or some other store, not shown).

Now turning to the pasting module 304, according to one illustrative implementation, this module 304 includes a paste selection module 318. The purpose of the paste selection module 318 is to paste an identified portion stored in the clipboard store 208 onto target content. The paste selection module 318 can perform this task by pointing to a particular part of the target content using a mouse device and/or some other type of input device and then entering an instruction to paste the clipboard contents at the identified location in the target content.

The pasting module 304 can also include a content merging module 320. The purpose of the content merging module 320 is to merge the identified portion stored in the clipboard store 208 into the target content. Recall that the target content may be expressed in a format that differs from the format of the source content. The content merging module 320 can perform the merging by separately merging the HTML information in the clipboard's first store 310 with HTML information used by the target content, and then merging style information (e.g., CSS information) in the clipboard's second store 312 with style information used by the target content. The content merging operation 320 can then combine together the merged HTML information and CSS information to render the final result. Each unique application can adopt application-specific rules to perform the above-described merging operations.

A.3. Example of the Operation of the Editing Module

Figure 4:
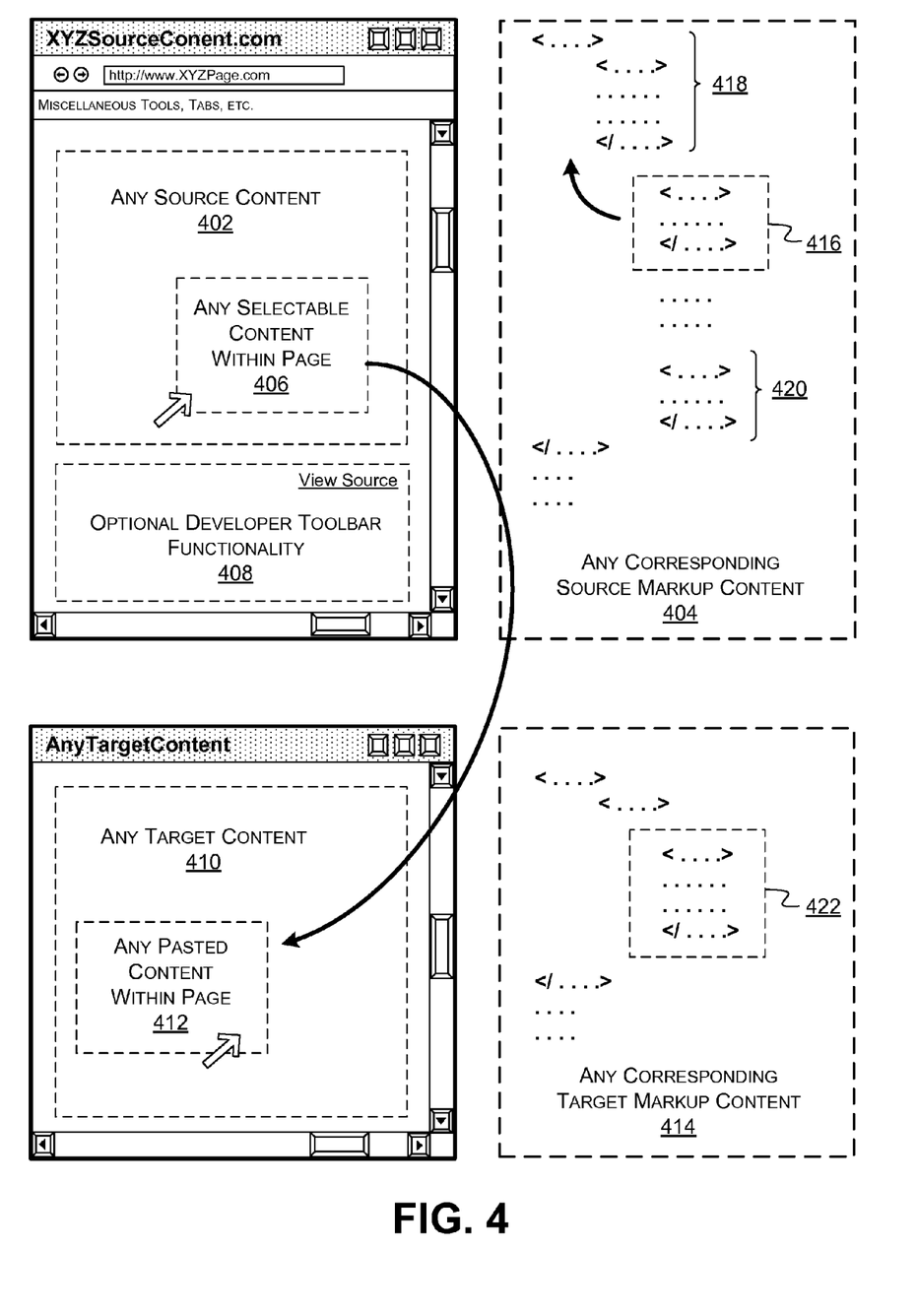
FIG. 4 shows an example of the application of the editing module of FIG. 3, in which an identified portion is copied from source content into target content.

FIG. 4 shows an example of the operation of the editing module 210 of FIG. 2. In this example, the top half of the figure shows source content 402 and corresponding markup language content 404 that is used to render the source content 402. The user has selected an identified portion 406 of the source content 402 to be stored in the clipboard store 208. The user can perform this selection operation by selecting a part of the source content 402 based on a graphical presentation of the content 402. Alternatively, or in addition, the user can select the identified portion by selecting a corresponding part of the content 402 in its underlying HTML form 404.

In another illustrative technique, a user interface presentation can include a first portion which presents the rendered source content 402 and a developer toolbar part 408 which displays the corresponding markup language content 404 and/or style information. The developer toolbar part 408 can allow a user to select a part of the rendered content, which causes the developer toolbar to display the corresponding markup content and/or style rules (e.g., in response to activating a "view source" command). The same is true in reverse; the user can select parts of markup content to cause corresponding parts of the rendered page to be highlighted. The user can select an identified portion by activating the developer toolbar 408 and then picking out the relevant HTML and/or style information which is of interest.

As shown on the bottom half of FIG. 4, the user can then paste the copied identified portion from the clipboard store 208 into target content 410. The user can perform this task by selecting a part of the target content 410 and then entering an instruction to paste the clipboard contents into the target content 410 at the identified location. The identified portion takes the form of pasted content 412 when it is pasted into the target content 410. The pasted content 412 should preferably have the same visual appearance as the identified portion 406 in the source content 402.

The pasting operation also has the effect of inserting the identified portion into the underlying structure of the target document. For instance, in the illustrative case in which the target content 410 is based on an HTML document, the target HTML content is modified to incorporate the identified portion 412.

Returning to the discussion of the copying operation, FIG. 4 illustrates that a part 416 of the HTML content 404 is directly demarcated by the identified portion 406 in the displayed source content 402. For example, when the identified portion 406 corresponds to a paragraph, the part 416 of the HTML content 404 may correspond to an element or elements which directly describe the paragraph. The copying module 302 can extract some style information from this part 416 of the HTML content 404. In addition, the copying module 302 investigates other nodes in the HTML content 404, such as parent nodes or ancestors nodes 418 and/or other nodes 420 which may have a bearing on style information that governs the appearance of the identified portion 406. The copying module 302 then extracts this information for storage in the clipboard store 208. The pasting module 304 pastes the identified portion 406 into the target document 410, which may have the effect of inserting various elements 422 into the target markup content 414, as well as modifying the style information that applies to the target markup content 414.

A.4. Illustrative Processing Functionality

Figure 5:
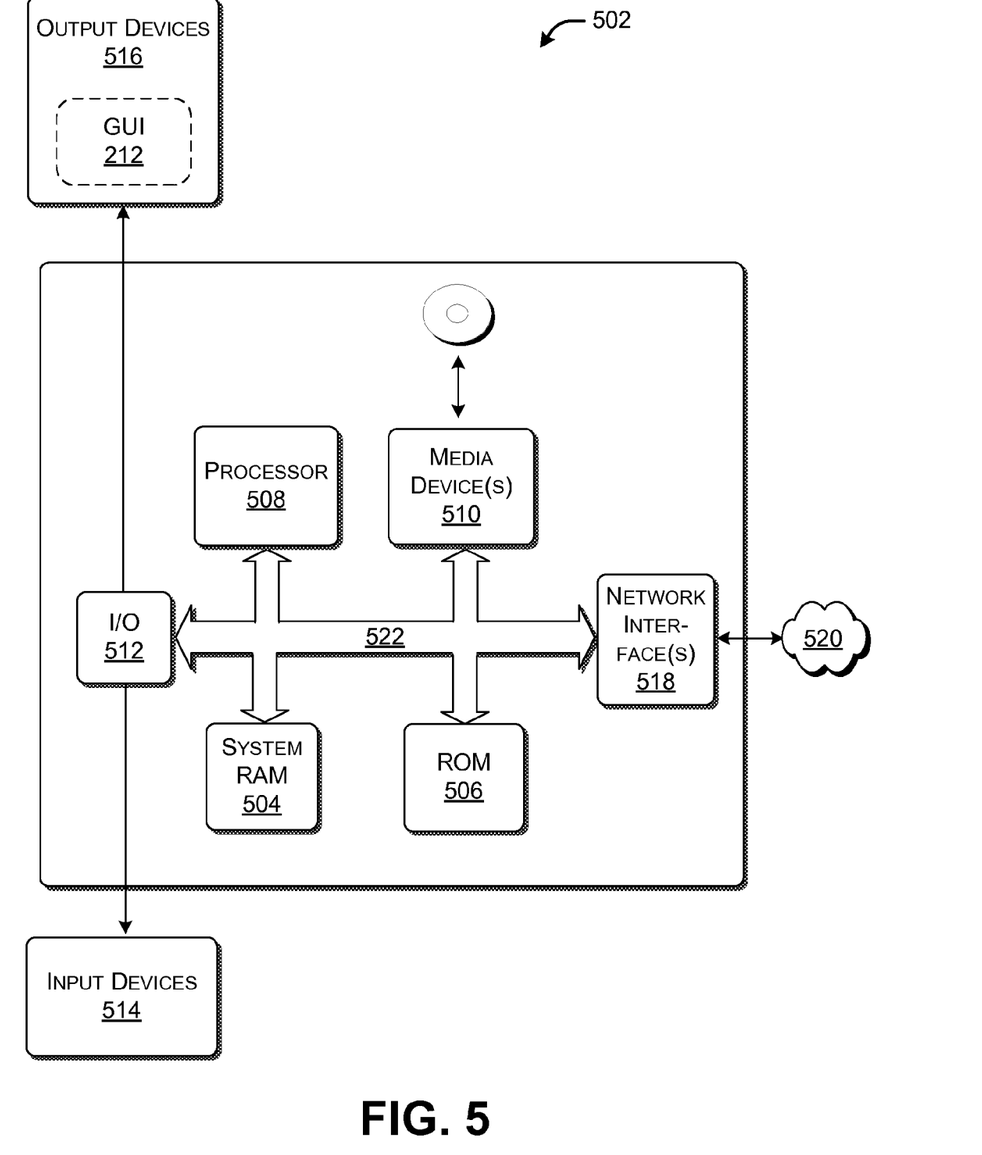
FIG. 5 shows illustrative processing functionality that can be used to implement any aspect of the system of FIG. 2.

FIG. 5 sets forth illustrative processing functionality 502 that can be used to implement any aspect of system 200 shown in FIG. 2. In one non-limiting case, for instance, the processing functionality 502 may represent any computer machine used by the system 200, e.g., to implement any aspect of the representative user device 202, any aspect of any sever-side entity, and so on.

The processing functionality 502 can include various volatile and non-volatile memory, such as RAM 504 and ROM 506, as well as one or more central processing units (CPUs) 508. The processing functionality 502 can perform various operations identified above when the CPU 508 executes instructions that are maintained by memory (e.g., 504, 506, or elsewhere). The processing functionality 502 also optionally includes various media devices 510, such as a hard disk module, an optical disk module, and so forth.

The processing functionality 502 also includes an input/output module 512 for receiving various inputs from the user (via input devices 514), and for providing various outputs to the user (via output devices 516). One particular output device may include the presentation module 214 and an associated graphical user interface (GUI) 212 introduced in the context of FIG. 2. The processing functionality 502 can also include one or more network interfaces 518 for exchanging data with other devices via one or more communication conduits 520, such as the network 222 introduced in the context of FIG. 2. One or more communication buses 522 communicatively couple the above-described components together.

B. Illustrative Procedures

Figure 6:
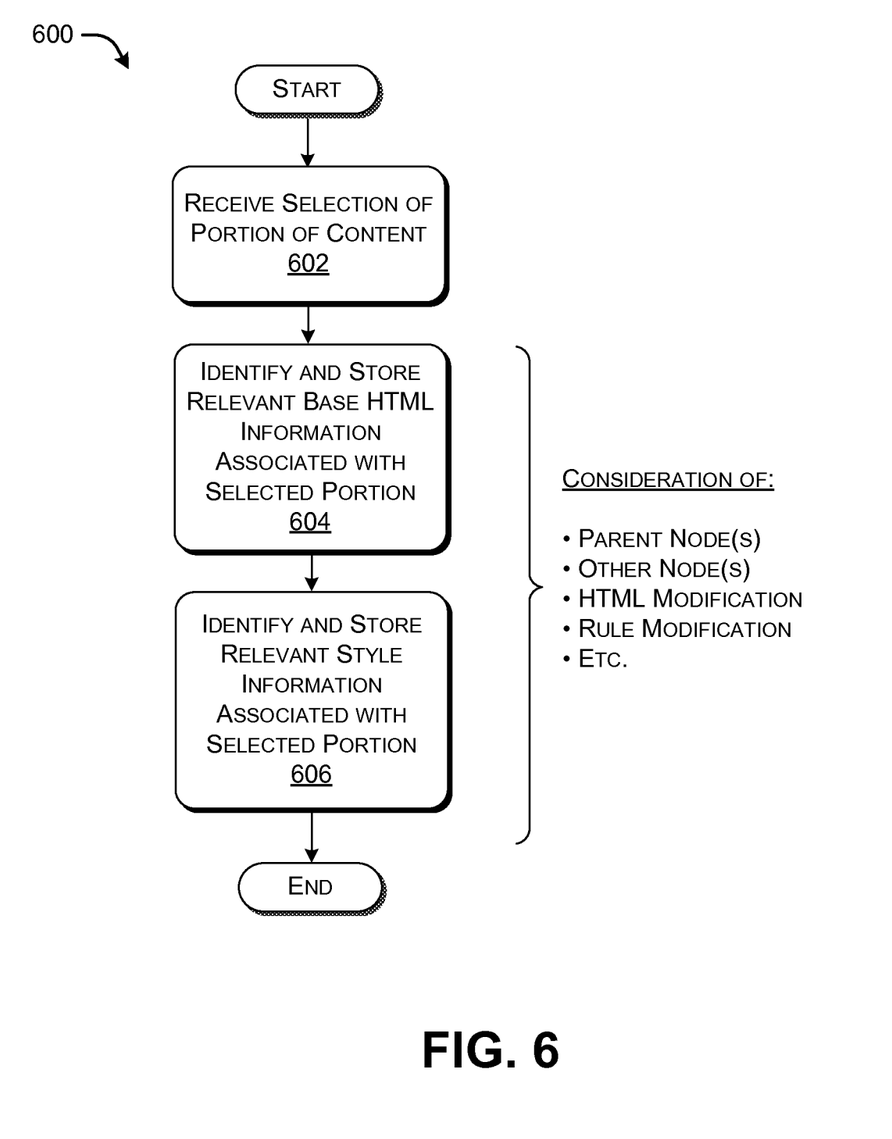
FIG. 6 is a flowchart that shows an illustrative procedure for performing a copy operation.
Figure 7:
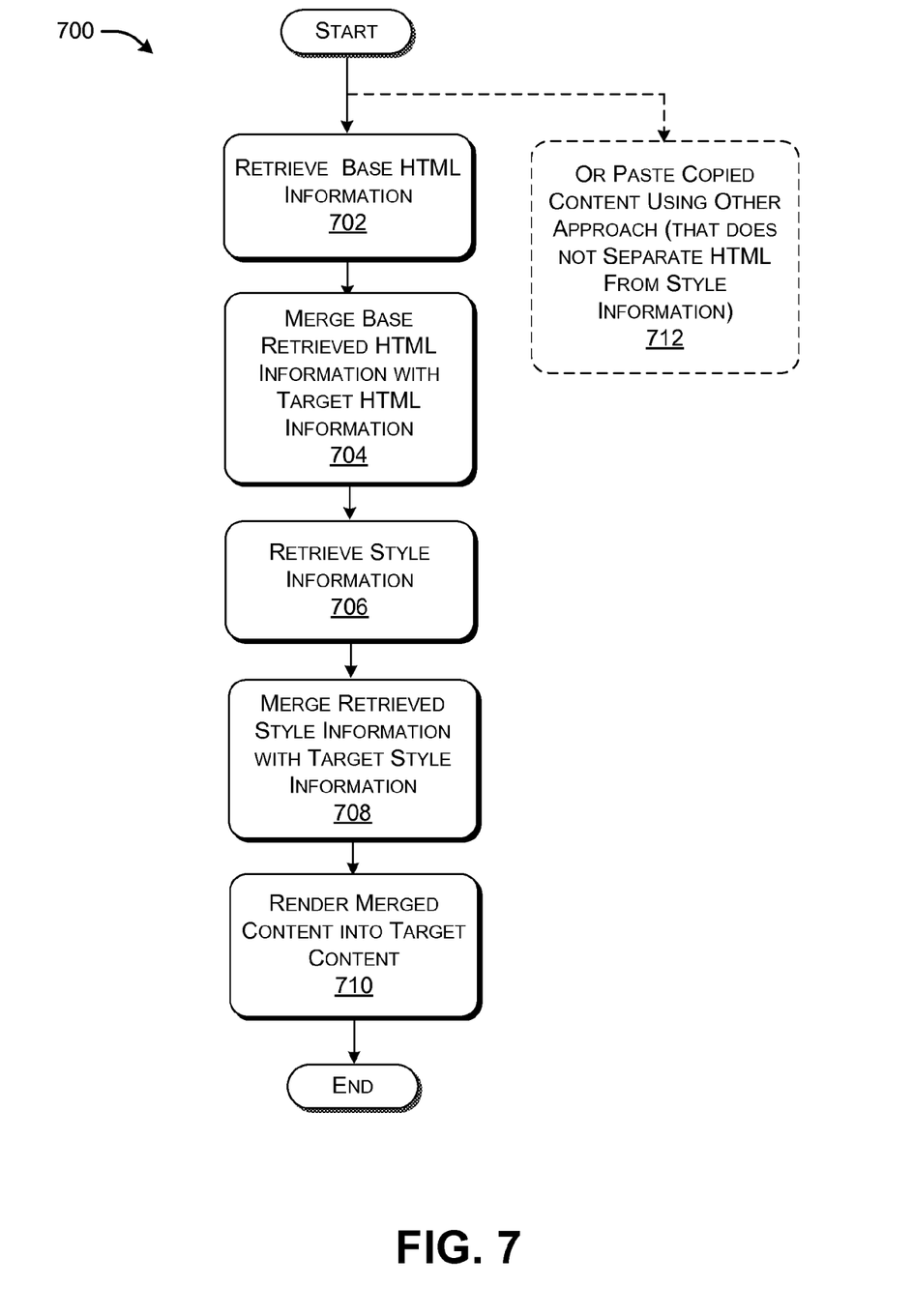
FIG. 7 is a flowchart that shows an illustrative procedure for performing a paste operation.

FIGS. 6 and 7 show illustrative procedures which explain the operation of the system 200 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

B.1. Copying Operation

FIG. 6 is a flowchart that shows one illustrative procedure 600 for copying an identified portion from source content into a clipboard store 208 (or some other kind of store), while preserving style information that applies to the identified portion in the source content.

In block 602, the copying module 302 receives a selection of an identified portion of source content in the manner described above.

In block 604, the copying module 302 identifies and stores relevant HTML information associated with the user's selection of the identified portion.

In block 606, the copying module 302 identifies and stores relevant style information associated with the user's selection of the identified portion. The style information may directly emanate from the identified portion, but part of the style information may have a more complex and indirect relation to the identified portion in the manner described above.

B.2. Pasting Operation

FIG. 7 is a flowchart that shows one illustrative procedure 700 for pasting an identified portion stored in the clipboard store 208 (or some other kind of store) into target content.

In block 702, the pasting module 304 retrieves base HTML information from the clipboard store 208 associated with the identified portion selected by the user.

In block 704, the pasting module 304 merges the extracted HTML information with the HTML information (or other kind of information) used by the target content.

In block 706, the pasting module 304 retrieves style information from the clipboard store 208 associated with the identified portion.

In block 708, the pasting module 304 merges the extracted style information with the style information used by the target content.

In block 710, the pasting module 304 renders the target content including the identified portion based on the merged HTML content provided in block 704 and the merged style information generated in block 708. The identified portion should preferably have the same or similar visual appearance in the target content as it does in the source content.

The procedure 700 can optionally include block 712, which allows the user to perform a pasting operation based on alternative information stored in the clipboard store 208, such as the information provided in the store 316 of the clipboard store 208. The information stored in the store 316 may not separately itemize HTML information and style information in the manner described above.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the implementations described herein.

More generally, although the implementations have been described in language specific to structural features and/or methodological acts, it is to be understood that the implementations are not necessarily limited to the specific features or acts described. Rather, the specific features and acts are disclosed as illustrative.

What is claimed is:

1. A method comprising:
    extracting a portion of style information from at least one source of style information, the portion of style information extracted corresponding to content that is identified by a user for copying from a source document, at least some of the style information being demarcated separately from the user-identified content, and the portion of style information being extracted from a source of style information that is external to the source document from which the user-identified content is identified responsive to a determination that the at least one source of style information includes an external source of style information;
    storing the portion of style information that is extracted with the user-identified content that is extracted in a clipboard store; and
    responsive to input to paste at least one portion of the stored content at a specified location within a target document, reconstructing the at least one portion of stored content at the specified location using the extracted portion of style information to have a same visual appearance at the specified location as in the source document.

2. The method as recited in claim 1, wherein the at least one source of style information is external to the source document from which the content is identified.

3. The method as recited in claim 1, wherein the at least one source of style information is inline in the source document with the identified content.

4. The method as recited in claim 1, wherein the portion of style information that is extracted omits at least some style information included in the at least one source of style information.

5. The method as recited in claim 1, wherein the portion of style information that is extracted is determined to affect how the user-identified content is presented and style information that is not extracted is determined not to affect how the user-identified content is presented.

6. The method as recited in claim 1, further comprising determining which of the style information included in the at least one source of style information to extract.

7. The method as recited in claim 1, further comprising rewriting the portion of style information that is extracted to reduce an amount of style information that is to be pasted with the stored content into the target document.

8. The method as recited in claim 7, wherein the rewritten style information preserves styling that is to be applied to the stored content according to the portion of style information that is extracted.

9. The method as recited in claim 1, further comprising revealing in a user interface one or more style rules of the portion of style information responsive to the user identifying the user-identified content for copying.

10. The method as recited in claim 9, wherein the source document from which the user-identified content is identified for copying is remote from the target document.

11. A system comprising:
    one or more processors; and
    computer-readable media comprising instructions that are executable by the one or more processors to implement a user interface that is operable to:
        present, in a first portion of the user interface, source content comprising part of a source document;
        present, in a second portion of the user interface and concurrently with the source content presented in the first portion of the user interface, markup and style information from a source of style information that is used to style an identified portion of the source content for display, the markup and style information presented responsive to identification by a user of the portion of source content from the first portion of the user interface, and the corresponding markup and style information that will be extracted from the source of style information being highlighted in the second portion of the user interface responsive to receiving a user input to copy the identified portion of source content; and
        receive a different user input to paste the identified portion of source content into target content with the corresponding markup and style information applied, the corresponding style information demarcated separately from elements of the corresponding markup that define the identified portion of source content that is copied and pasted, and the corresponding style information including style information that is external to the source document.

12. The system as recited in claim 11, wherein the user interface is further operable to receive a user selection of markup and style information from the second portion of the user interface, the user selection causing the user interface to emphasize corresponding portions of the source content in the first portion of the user interface.

13. The system as recited in claim 12, wherein the user interface is further operable to receive an additional user selection of different markup and style information from the second portion of the user interface, the additional user selection causing the user interface to emphasize different portions of the source content in the first portion of the user interface that correspond to the different markup and style information.

14. The system as recited in claim 11, wherein the user interface is further operable to receive input to copy the source content presented in the first portion to a clipboard store.

15. The system as recited in claim 11, wherein the user interface is further operable to receive input to copy the markup and style information presented in the second portion of the user interface to a clipboard store.

16. The system as recited in claim 11, wherein the user interface is further operable to receive a command that activates display of the second portion of the user interface in which the markup and style information are presented.

17. The system as recited in claim 11, wherein the user interface is further operable to employ an information extraction module that is configured to extract the style information corresponding to the identified portion of source content from the source document and from sources external to the source document.

18. The system as recited in claim 11, wherein the style information that is external to the source document comprises Cascading Style Sheet (CSS) information.

19. A system comprising:
one or more processors; and
a memory having computer-readable instructions stored thereon that are executable by the one or more processors to perform operations comprising:
receiving an identification by a user of a portion of content in a source document to be copied, the content in the source document corresponding to underlying style information that is applied to the content to control visual appearance of the content, at least some of the underlying style information demarcated separately from elements of the source document defining the portion of content to be copied;
responsive to a determination that the user-identified portion of content corresponds, in part, to underlying style information external to the source document, extracting the underlying style information that is external to the source document from one or more external sources;
storing the user-identified portion of content in a clipboard store with the underlying style information, including the underlying style information extracted from the one or more external sources; and
responsive to input to paste at least one portion of the user-identified portion of content at a specified location within a target document, reconstructing the at least one portion at the specified location with the underlying style information to retain visual appearance of the user-identified portion of content as in the source document.

20. The system as recited in claim 19, wherein the operations further comprise causing the user-identified portion of content to be pasted in the target document to visually resemble the user-identified portion of content as the user-identified portion of content appears in the source document.

* * * * *